(12) United States Patent
Feistel (10) Patent No.: US 12,297,826 B2
(45) Date of Patent: May 13, 2025

(54) THROTTLE ARRANGEMENT FOR PISTON COMPRESSORS

(71) Applicant: BURCKHARDT COMPRESSION AG, Winterthur (CH)

(72) Inventor: Norbert Feistel, Ellikon a.d. Thur (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 97 days.

(21) Appl. No.: 18/269,106

(22) PCT Filed: Dec. 21, 2021

(86) PCT No.: PCT/EP2021/087092
§ 371 (c)(1),
(2) Date: Jan. 2, 2024

(87) PCT Pub. No.: WO2022/136433
PCT Pub. Date: Jun. 30, 2022

(65) Prior Publication Data
US 2024/0133372 A1   Apr. 25, 2024

(30) Foreign Application Priority Data
Dec. 23, 2020 (EP) .................................. 20217155

(51) Int. Cl.
*F04B 53/02* (2006.01)
*F04B 39/04* (2006.01)
(Continued)

(52) U.S. Cl.
CPC ............ *F04B 53/02* (2013.01); *F04B 39/041* (2013.01); *F16J 15/26* (2013.01); *F16J 15/441* (2013.01); *F16J 15/56* (2013.01)

(58) Field of Classification Search
CPC . F16J 15/26; F16J 15/441; F16J 15/56; F04B 53/02
See application file for complete search history.

(56) References Cited

U.S. PATENT DOCUMENTS

| 1,799,335 A | 4/1931 | Waddell |
| 3,469,855 A | 9/1969 | Enting |

(Continued)

FOREIGN PATENT DOCUMENTS

CH          439897 A          7/1967

OTHER PUBLICATIONS

International Search report for PCT/EP2021/087092, prepared by the European Patent Office, mailing date Apr. 28, 2022, 5 pages.

*Primary Examiner* — Michael Leslie
(74) *Attorney, Agent, or Firm* — Brooks Kushman P.C.

(57) ABSTRACT

A throttle arrangement for sealing a sliding surface of a body in a piston compressor the throttle arrangement having annular sealing discs and a sealing disc holder having an L-shaped radial section having a first leg running in the axial direction and a second leg running transversely, the second leg being annular and having a bearing surface pointing in the direction of the high-pressure side, the sealing discs are stacked one on top of one another axially, the first leg being cylindrical extending from the bearing surface toward the high-pressure side, the axial height of the first leg H4 allow bearing surface to have axial play, the first leg gas passage openings, the first leg having a boundary surface facing in the sealing discs, aligned coaxially with the first limb and the body, a first annular gap RS1 is formed between the boundary surface and the sealing discs.

19 Claims, 8 Drawing Sheets

(51) Int. Cl.
*F16J 15/26* (2006.01)
*F16J 15/44* (2006.01)
*F16J 15/56* (2006.01)

(56) References Cited

U.S. PATENT DOCUMENTS

| | | | | |
|---|---|---|---|---|
| 4,093,239 A * | 6/1978 | Sugahara | ............. | F16J 15/40 |
| | | | | 277/516 |
| 4,289,322 A | 9/1981 | Traversari et al. | | |
| 11,698,062 B2 * | 7/2023 | Feistel | ............. | F16J 15/26 |
| | | | | 417/228 |
| 11,852,243 B2 * | 12/2023 | Feistel | ............. | F16J 15/26 |
| 11,879,447 B2 * | 1/2024 | Zhou | ............. | F04B 53/02 |

* cited by examiner

THROTTLE ARRANGEMENT FOR PISTON COMPRESSORS

CROSS-REFERENCE TO RELATED APPLICATION

This application is the U.S. national phase of PCT Application No. PCT/EP2021/087092 filed on Dec. 21, 2021, which claims priority to EP patent application No. 20217155.9 filed on Dec. 23, 2020, the disclosures of which are incorporated in their entirety by reference herein.

TECHNICAL FIELD

The present invention relates to a throttle arrangement for piston compressors. The present invention further relates to a piston compressor comprising such a throttle arrangement and to the use of such a throttle arrangement in a piston compressor.

BACKGROUND

Compressors, and in particular piston compressors, are used as standard for the compression of liquids or gases. In order to prevent an undesired or uncontrolled outflow of the medium to be compressed, or at least to reduce it to a minimum, the compression chamber must be sealed off as well as possible from its surroundings. The area where the piston rod passes through into the cylinder interior is usually sealed by a so-called piston rod packing, which comprises several sealing elements arranged one behind the other in the axial direction of the piston rod.

Throttle rings represent piston rod sealing elements which are arranged at the end of the piston rod packing facing the compression chamber to reduce dynamic pressure peaks. The dynamic pressure component, i.e. the difference between compression pressure and suction pressure changing between zero and a maximum value during one crankshaft revolution, is to be kept away from the actual sealing elements to protect them from fracture failure.

The throttle rings known from the prior art are usually designed either as frictionless sealing elements from the start or also as frictionless sealing elements with low run-in wear. Such throttle rings are known, for example, from patent CH 439 897.

However, the common frictionless throttle rings have the disadvantage that they contribute very little to sealing the dynamic pressure component, which leads to rapid wear of the actual sealing elements arranged downstream. In addition, any contact between the throttle ring and its mating partner during operation leads to a wear-related increase in the minimum gap between the throttle ring and the mating partner, as a result of which the sealing function of the throttle ring is further reduced and ultimately lost.

SUMMARY

Based on the aforementioned prior art, the present invention is based on the object of at least reducing such and further disadvantages of the prior art and, in particular, of specifying a throttle arrangement of the type mentioned at the beginning, which has an improved sealing function compared to the known throttle ring designs and enables a longer service life.

The object is solved by a throttle arrangement, a piston compressor comprising such a throttle arrangement, and the use of such a throttle arrangement in a piston compressor, in particular for sealing the dynamic pressure component, having the features of the independent claims. Advantageous designs and further developments are the subject of the dependent claims.

The object is solved in particular by a throttle arrangement for sealing a sliding surface of a body of a piston compressor movable in an axial direction, the throttle arrangement having, in use, a high-pressure side on the compression chamber side and a low-pressure side on the crank drive side. The throttle arrangement according to the invention comprises a plurality of annular sealing discs and a sealing disc holder. The sealing disc holder has an L-shaped radial section, which is formed by a first leg extending in the axial direction and a second leg extending transversely to the axial direction. The second leg is circular in shape and has a bearing surface facing in the direction of the high-pressure side, on which the sealing discs are stacked on top of one another in the axial direction. The first leg is cylindrical in shape and extends along the outer or inner circumference of the second leg from the bearing surface in the direction of the high-pressure side. The axial height of the first leg is selected in such a way that the sealing discs stacked on the bearing surface have a certain axial clearance in use. Consequently, the sealing discs are not clamped in the axial direction and are thus movable transversely to the axial direction. The first leg also has a plurality of gas passage openings and a boundary surface facing in the direction of the sealing discs. When the sealing discs are aligned coaxially with the first leg and the body to be sealed, a first annular gap is formed between the boundary surface and the sealing discs in each case, which is fluidically connected to the high-pressure side through the gas passage openings. A second annular gap is formed between the sliding surface of the body to be sealed and the sealing discs in each case, the wear-related increase in size of which is essentially limited by the radial width of the first annular gap.

The sealing disc holder of the throttle arrangement according to the invention is thus a sealing disc magazine in which the sealing discs lie with their seating surfaces on top of each other in a kind of series connection and form a sealing disc pack. Typically, the radial width of the second annular gap in the non-run-in state of the throttle arrangement is less than the radial width of the first annular gap. Thus, during the run-in process, some wear caused by contact between the sealing discs and the body to be sealed during operation is allowed on the surfaces of the sealing discs facing the sliding surface before the sealing discs are prevented from further wear by the boundary surface. In other words, the sealing disc holder ensures that the individual sealing discs cannot move relative to each other in the run-in condition by more than the radial distance specified by the first annular gap, thus preventing or at least significantly reducing further enlargement of the second annular gap. The throttle arrangement according to the invention is particularly suitable for sealing a piston rod or piston of a dry-running piston compressor and can also be used in compressing very light gases such as hydrogen, where sealing elements with a good sealing effect that is constant over a long period are required.

Since the sealing effect results from the different positions of the sealing discs relative to each other, limited wear on the individual discs is possible, in contrast to the throttle rings known from the prior art, without this leading directly to a deterioration of the sealing effect. However, limiting radial wear is absolutely necessary, since excessive wear on the individual sealing discs can lead to the formation of more arrangements with a straight flow path that do not exhibit sufficient flow resistance.

For this reason, in a preferred embodiment of the throttle arrangement according to the invention, the radial width of the first annular gap, and thus the substantially maximum permissible radial clearance of the sealing discs in the sealing disc holder, is in each case no more than 1 mm.

The number, position and geometry of the gas passage openings of the sealing disc holder can vary according to the respective requirements.

In a preferred embodiment of the throttle arrangement according to the invention, the gas passage openings extend over the entire axial height of the first leg of the sealing disc holder, ensuring that the gas pressure of the high pressure side is effective along the entire axial height of the sealing disc pack, i.e. at each sealing disc in the sealing disc holder.

Alternatively or additionally, in the throttle arrangement according to the invention, the gas passage openings are evenly distributed in the circumferential direction of the first leg of the sealing disc holder. This ensures that the gas pressure of the high pressure side is effective along the entire outer circumference of the sealing discs and that there is no uneven loading of the sealing discs.

In a further preferred embodiment of the throttle arrangement according to the invention, the ratio between the sum of the areas of the gas passage openings and the boundary area, i.e. including the areas of the gas passage openings, is between 1:2 and 1:4. Preferably, the ratio between the sum of the areas of the gas passage openings and the boundary area is between 1:2.8 and 1:3. The specified value ranges represent particularly favorable compromises between the mechanical stability of the sealing ring holder, in particular with regard to limiting the radial clearance of the sealing discs in the sealing disc holder, and the effectiveness of the gas pressure from the high pressure side on the sealing discs. Optimum limitation of the radial clearance of the sealing discs reduces contact between the sealing discs and the moving piston rod during use and minimizes friction-related wear of the sealing discs.

In a further preferred embodiment of the throttle arrangement according to the invention, the first leg of the sealing disc holder has eight gas passage openings. The eight gas passage openings preferably extend over the entire axial height of the first leg and are evenly distributed in the circumferential direction of the first leg. The resulting symmetry means that pressure forces act particularly uniformly on the throttle arrangement, increasing its service life.

Depending on the design of the piston compressor in which it is used, the throttle arrangement according to the invention can be operated dry-running or oil-lubricated. In the case of a dry-running throttle arrangement, at least the sealing discs must have dry-running properties. If the sealing disc holder also comes into contact with the sliding surface of the body to be sealed during operation, it is preferred if at least the second leg of the sealing disc holder has dry-running properties.

In a further preferred embodiment of the throttle arrangement according to the invention, the sealing disc holder is formed in one piece, i.e. consisting of one part. Preferably, the sealing disc holder is made of a material with good emergency running properties in dry-running operation of the throttle arrangement. Such a sealing disc holder has a particularly high stability and enables a particularly long service life of the throttle arrangement according to the invention.

Preferably, the sealing disc holder is made of pure or filled high-temperature polymer, pure or filled fiber composite material, or, in the case of very high pressure differentials, metal, such as bronze.

Suitable high-temperature polymers include pure or filled polyetheretherketone (PEEK), pure or filled polyimide (PI), pure or filled polyphenylene sulfide (PPS), or pure or filled epoxy.

A suitable fiber composite material is, for example, a carbon fiber reinforced plastic (CFRP). A CFRP is a composite material in which carbon fibers are embedded in a plastic matrix, for example PEEK or epoxy. The matrix material is used to join the fibers as well as to fill the gaps. Other thermosets or thermoplastics are also suitable as matrix materials.

Inorganic fillers, such as carbon, graphite, glass fibers, $MoS_2$ and/or glass fibers, can be added to the plastics used to improve their physical, mechanical and/or tribological properties, in particular to impart dry-running properties.

Suitable metals include bronze materials such as aluminum, lead, or tin bronze, as well as a material such as brass.

Within the framework of the radial clearance of the individual sealing discs, these can shift in relation to the coaxial alignment of all sealing discs with the boundary surface within the receiving space. This displacement can occur differently for each sealing disc, whereby the dynamic pressure component acting on the sealing discs leads to changing gap widths to the piston rod. The combination of all sealing discs thus results in a type of dynamic labyrinth seal, which increases the flow resistance and thus leads to an improved sealing effect of the throttle arrangement, in particular with respect to the dynamic pressure component.

Since the flow resistance results from the random orientation of the sealing discs relative to each other, which differs from the coaxial orientation, the number of sealing discs in the throttle arrangement according to the invention should be at least three. Preferably, the number of sealing discs in the throttle arrangement according to the invention is exactly five. This number of sealing discs ensures particularly efficient flow diversion, while at the same time keeping the axial height of the throttle arrangement compact.

Due to the series connection of the sealing discs in the throttle arrangement according to the invention, the individual sealing discs do not necessarily have to have the best sealing effect possible, since the sealing effect of the throttle arrangement, as previously described, is based on the combination of several sealing discs and the increase in flow resistance due to the continuous rearrangement of the sealing discs in the throttle arrangement.

However, it is advantageous if the sealing discs of the throttle arrangement according to the invention are formed as a single piece and are endless, as this allows the sealing discs to be manufactured in a particularly robust manner with respect to the load with a dynamic pressure difference.

In a preferred embodiment of the throttle arrangement according to the invention, the sealing discs have an axial height of between 1 mm and 5 mm. Preferably, the axial height of the sealing discs is between 2.4 mm and 2.6 mm, which allows the throttle arrangement to be particularly compact in the axial direction.

Within the throttle arrangement, the pressure decreases from the high-pressure side towards the low-pressure side, i.e. between the sealing disc arranged uppermost in the sealing disc holder towards the sealing disc supported on the base surface of the receiving chamber. While the pressure in the sealing gap, i.e. in the second annular gap, decreases in the direction of the low-pressure side, the pressure acting on the outer circumferential surface of the sealing discs, i.e. the pressure in the first annular gap, remains constant. The same pressure is thus applied to the outer and inner circumferential surfaces of the sealing disc arranged at the top of the throttle arrangement, whereas a maximum pressure difference prevails between the outer and inner circumferential surfaces of the sealing disc arranged at the bottom of the throttle arrangement. The elastic-plastic deformation of the sealing discs in the radial direction resulting from the pressure difference therefore leads to a smaller sealing gap and thus to a higher wear potential for the lowest sealing disc compared to the other sealing discs.

To take account of this different load on the sealing discs, the sealing discs in a preferred embodiment of the throttle arrangement according to the invention are made of different materials. The modulus of elasticity (or Young's modulus) is a material parameter from materials engineering that describes the proportional relationship between stress and strain during the deformation of a solid body in the case of linear-elastic behavior. The modulus of elasticity increases with the resistance of a material to elastic deformation. The modulus of elasticity is usually determined on material samples of plastics in tensile tests, whereby samples with a known initial cross-section are clamped in a tensile testing machine and loaded with a tensile force F. The tensile force is then increased over a period of time. As the force is increased, this is then plotted against the change in length ΔL caused. Test methods for the tensile test are specified, for example, in EN ISO 527-1/-2.

Since the sealing disc arranged at the bottom of the throttle arrangement according to the invention experiences the greatest pressure difference, the modulus of elasticity of the material used for the sealing discs increases preferentially in the direction of the low-pressure side. This measure allows the flow resistance and service life of the throttle arrangement to be further increased.

For example, according to the invention, it is conceivable that a relatively soft material, e.g. filled PTFE, is used for one or more of the sealing discs arranged at the top, followed by one or more sealing discs made of a high-temperature polymer, e.g. PEEK, PPS or PI, in the middle region, and finally one or more sealing discs made of a material with high strength, e.g. a bronze or ceramic, in the lower region. Of course, the use of mixtures of different polymers in a single sealing disc and/or the use of fillers, for example to improve the dry-running properties, is also conceivable in accordance with the invention.

To ensure that the stiffer discs featuring a higher modulus of elasticity still undergo sufficient elastic-plastic deformation in this combination, it is preferred according to the invention if at least one of the sealing discs, preferably all the sealing discs in the sealing disc holder, has an axial height that differs from that of the other sealing discs.

In a preferred embodiment of the throttle arrangement according to the invention, the axial height of the sealing discs increases in the direction of the low-pressure side. An increase in the axial dimension of the sealing discs leads to an increase in the outer circumferential area of the respective sealing discs and thus to a greater effectiveness of the gas pressure, whereby an improved sealing effect is achieved.

The object is further solved with a piston compressor, in particular a dry-running piston compressor, comprising at least one throttle arrangement as described herein.

The object is further solved by the use of a throttle arrangement as described herein for sealing a piston rod or piston, in particular with respect to the dynamic pressure difference.

BRIEF DESCRIPTION OF THE DRAWINGS

Various embodiments of the invention are described below with reference to drawings, wherein identical or corresponding elements are generally provided with identical reference signs. It is shown:

FIG. 1b a longitudinal section through the throttle assembly along line B-B in FIG. 1a;

FIG. 2a a top view of the sealing disc holder from FIG. 1a;

FIG. 2b a longitudinal section through the sealing disc holder along line B-B in FIG. 2a;

FIG. 3a a top view of a sealing disc from FIG. 1a;

FIG. 3b a longitudinal section through the sealing disc along line C-C in FIG. 3a;

FIG. 6b a longitudinal section through the throttle assembly along line C-C in FIG. 6a;

DETAILED DESCRIPTION

Figure 1A:
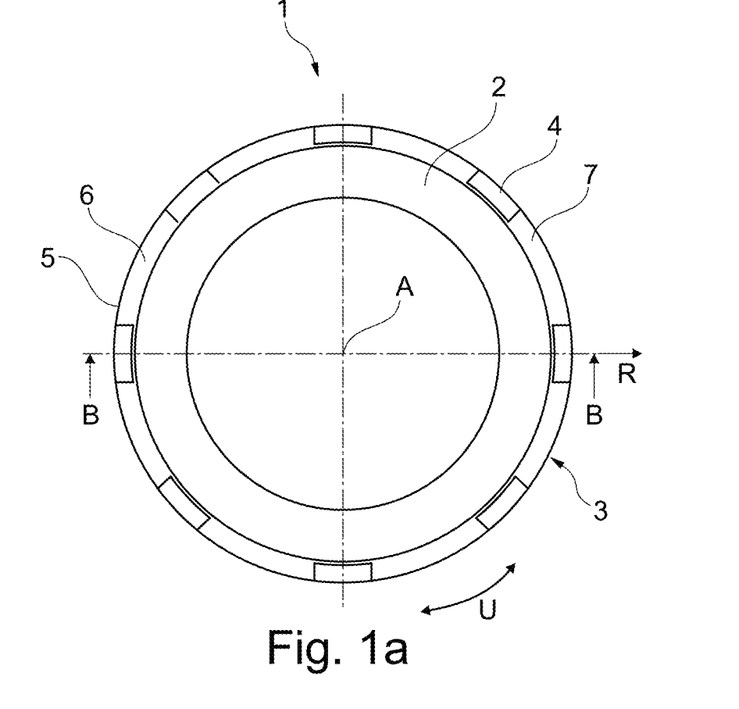
FIG. 1a A top view of a first embodiment of a throttle arrangement according to the invention.

FIG. 1a shows a top view of a first embodiment of a throttle arrangement 1 according to the invention comprising a sealing disc holder 3 and a plurality of sealing discs 2, whereby, in accordance with the top view shown, only the sealing disc arranged uppermost in the axial direction A is visible in this representation. The sealing disc holder 3 has an L-shaped radial section in the radial direction R, as can be seen below in FIG. 1b, with a first leg 4 running in the axial direction A and a second leg 5 running transversely to the axial direction A. The second leg 5 is of annular design and has a bearing surface 6 on which the sealing discs 2 are arranged stacked on top of one another in the axial direction A. The first leg 4 is cylindrical in shape and the second leg 5 is circular in shape. The first leg 4 is cylindrical and extends in the circumferential direction U along the outer circumference of the second leg 5 from the bearing surface 6 in the direction of the sealing discs 2. The first leg also has a boundary surface 8 on its side facing the sealing discs 2, which is interrupted in the circumferential direction U by eight uniformly distributed gas passage openings 7.

Figure 1B:
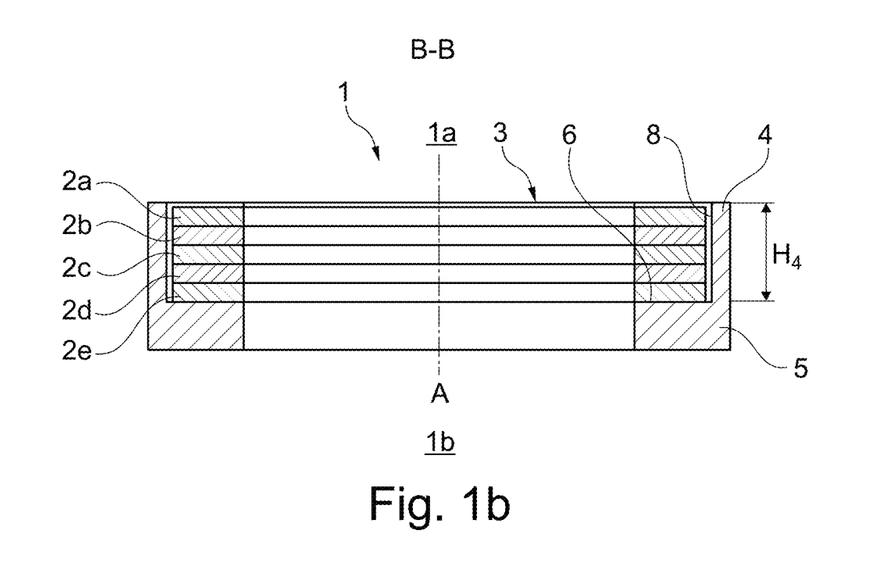

FIG. 1b shows a longitudinal section through the throttle arrangement 1 shown in FIG. 1a along the line of intersection B-B in FIG. 1a. A total of five sealing discs 2a-e can be seen, which are stacked on top of each other in axial direction A. The sealing discs 2 can be inserted into the sealing disc holder 3 from the high-pressure side 1*a*, with the lowest sealing disc 2*e* arranged in the sealing disc holder 3 resting on the bearing surface 6 of the sealing disc holder 3 with its flank pointing in the direction of the low-pressure side 1*b*. With respect to the first leg 4, the second leg 5 points radially inward in this embodiment. Consequently, the cylindrical first leg 4 extends along the outer circumference of the second leg 5, namely from the bearing surface 6 over slightly more than the entire axial height of the stacked sealing discs 2*a-e* in the direction of the high-pressure side 1*a*. In this embodiment example, the first leg 4 and the boundary surface 8 have an axial height $H_4$ of 13 mm, with the axial height of the sealing discs 2*a-e* each being 2.5 mm. The difference between the axial height of the first leg $H_4$ and the sum of the axial heights of the stacked sealing discs 2*a-e* results in an axial clearance of the sealing discs 2 in the sealing disc holder 3 of 0.5 mm in the shown embodiment example, which ensures that the sealing discs 2 are movable in the radial direction in use, as will be explained in more detail below.

Figure 1C:
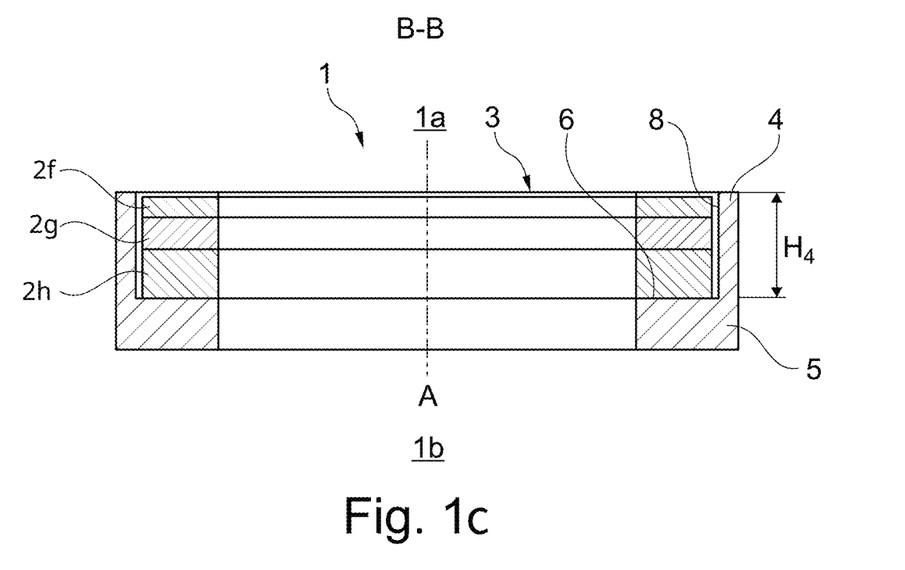
FIG. 1c a longitudinal section through the throttle assembly along line B-B with increasing axial height of the sealing discs in direction of the low-pressure side.

FIG. 1*c* shows a figure like FIG. 1*b*, where at least one of the sealing discs 2*f-h* has an axial height different from the other sealing discs and the axial height of the sealing discs increases in the direction of the low-pressure side.

Figure 2A:
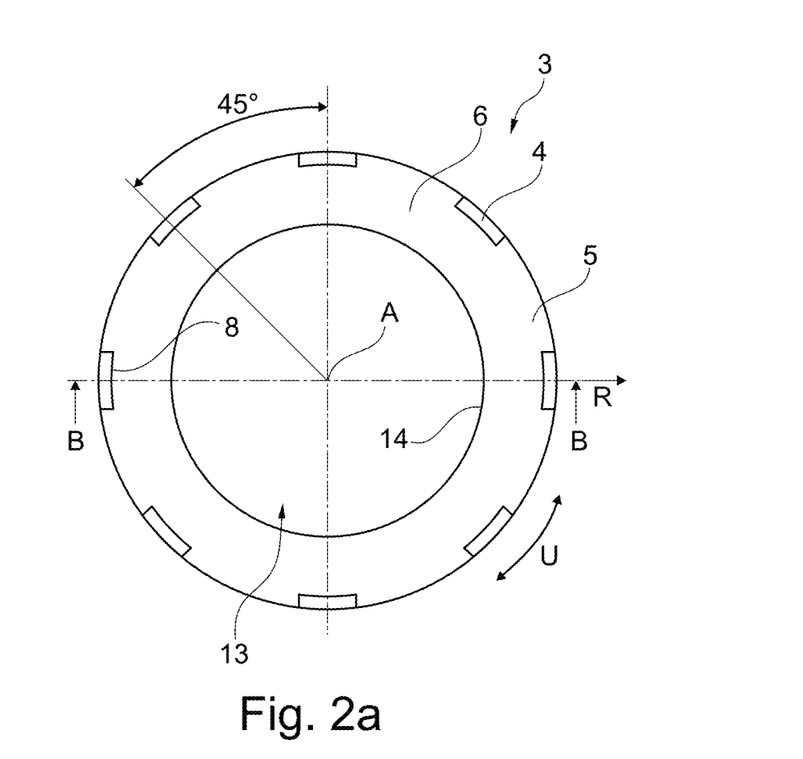

FIG. 2*a* shows a top view of the sealing disc holder 3 of the throttle arrangement 1 shown in FIG. 1*a*. The sealing disc holder 3 comprises a circular second leg 5 with a bearing surface 6, which has a central through opening 13 extending in the axial direction A for receiving a piston rod (not shown), the through opening 13 being defined by the inner circumferential surface 14 of the second leg 5. The sealing disc holder 3 further comprises a first leg 4 extending along the outer periphery of the second leg 5 and having a boundary surface 8 facing inwardly in the radial direction R, which defines a receiving space for sealing discs (not shown). The first leg 4 is interrupted by eight gas passage openings 7 arranged uniformly distributed in the circumferential direction U. The boundary surface 8 is thereby subdivided into eight boundary surface segments 8, the center angle between the centers of two adjacent boundary surface segments 8 being 45° in each case.

Figure 2B:
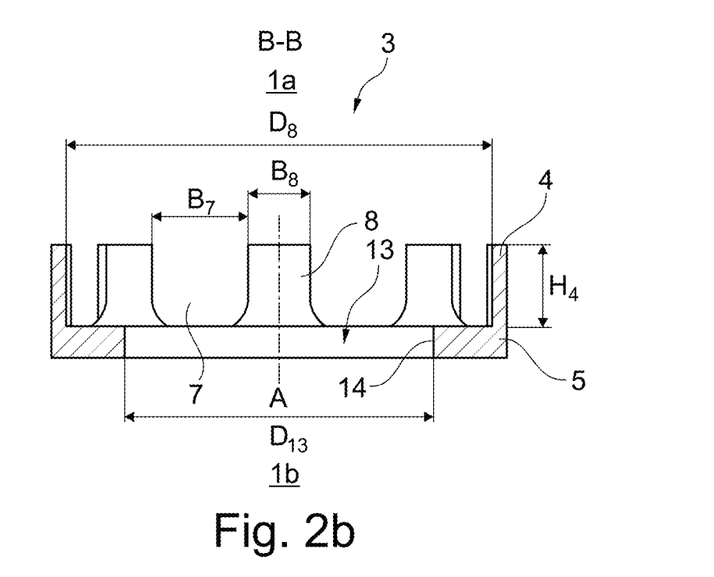

FIG. 2*b* shows a longitudinal section through the sealing disc holder 3 shown in FIG. 2*a* along the line of intersection B-B in FIG. 2*a*. In the embodiment shown, the inner diameter $D_{13}$ of the central through opening 13 of the second leg 5 defined by the inner circumferential surface 14 is 50 mm. The clear diameter of the receiving space $D_8$ defined by the boundary surface segments 8 is 69 mm. The first leg 4 has an axial height $H_4$ of 13 mm and is interrupted in the circumferential direction by eight gas passage openings 7, each of which extends over the entire axial height $H_4$ of the first leg and has an arc length $B_7$ of about 19 mm. The arc length of the individual boundary surface segments $B_8$ thus obtained is around 10 mm. The specified arc lengths are measured along the side of the boundary surface 8 facing the high-pressure side 1*a*.

Figure 3A:
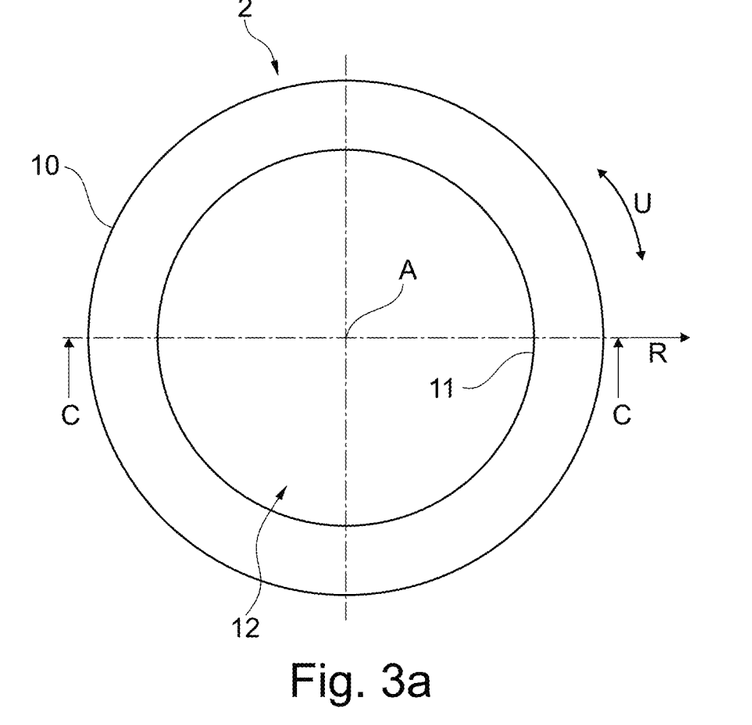

FIG. 3*a* shows a top view of a sealing disc 2 from the throttle arrangement 1 shown in FIG. 1*a*. The sealing disc 2 is formed in one piece and is endless in the circumferential direction U and has a central through-opening 12 in the axial direction A for receiving a piston rod (not shown). However, as will be described below for a second embodiment of the throttle arrangement according to the invention, the central through opening 12 of the annular sealing disc 2 can alternatively also serve to receive the cylindrical first leg of the sealing disc holder. The sealing disc 2 has an outer circumferential surface 10 pointing outwards in the radial direction R and an inner circumferential surface 11 pointing radially inwards, the inner circumferential surface 11 delimiting the central through-opening 12 of the sealing disc 2 transversely to the axial direction A.

Figure 3B:
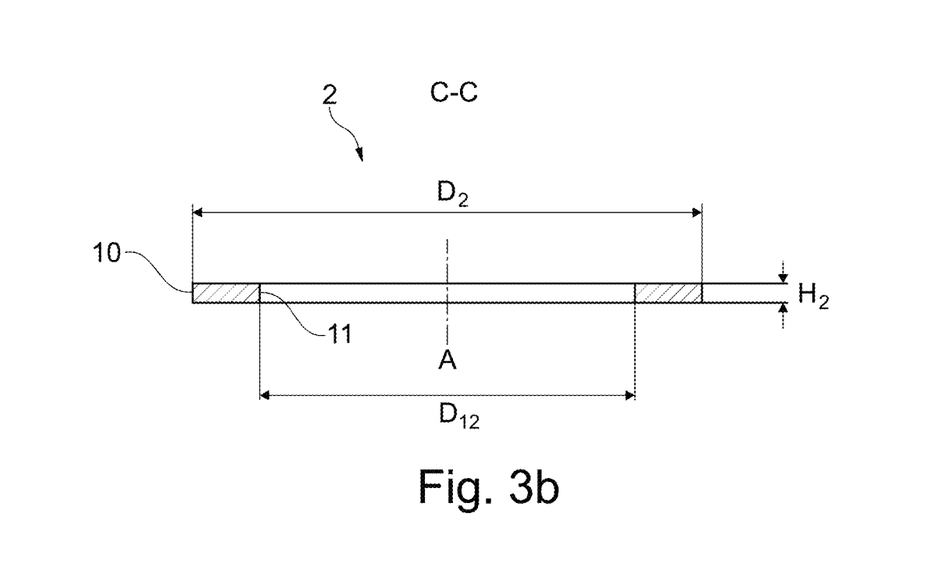

FIG. 3*b* shows a longitudinal section through the sealing disc 2 shown in FIG. 3*a* along the line of intersection C-C in FIG. 3*a*. The sealing disc 2 has an axial height $H_2$ of 2.5 mm and an outer diameter $D_2$ of 68 mm relative to the outer circumferential surface 10 of the sealing disc 2. The clear diameter of the central passage opening 12, $D_{12}$, bounded by the inner circumferential surface 11 is 50 mm.

Figure 4:
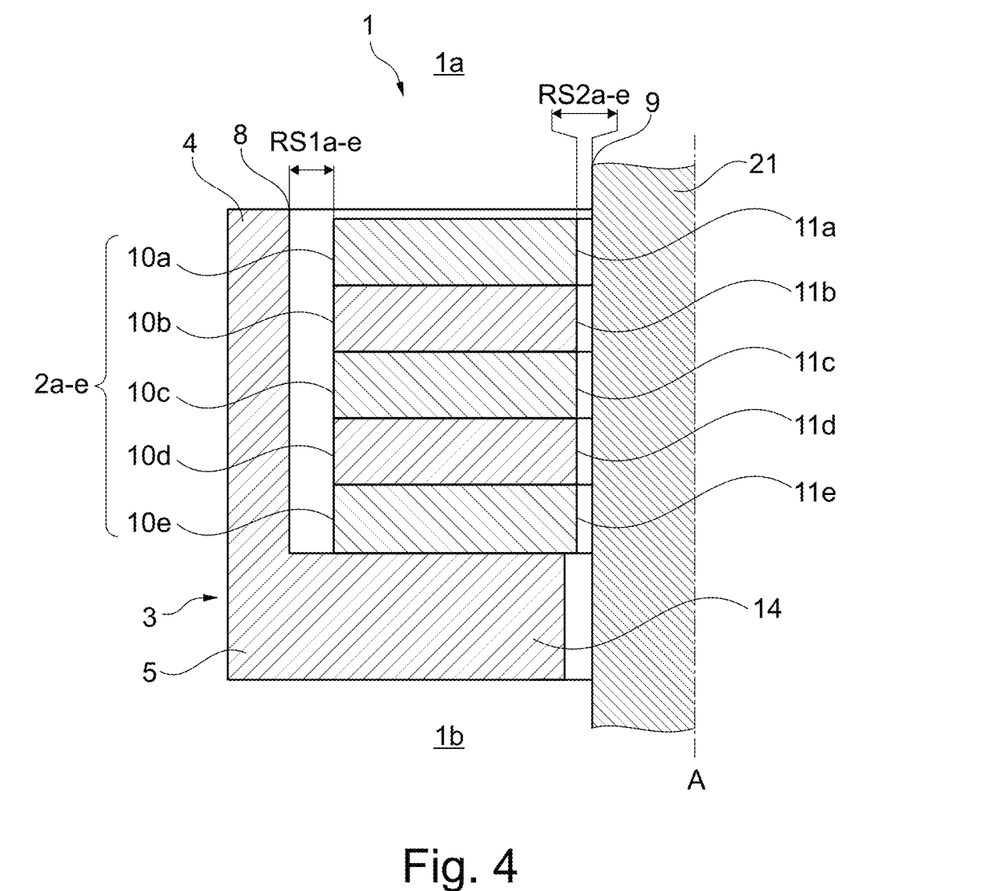
FIG. 4 a longitudinal section through a piston compressor showing one half of the throttle arrangement according to the invention from FIG. 1a with a piston rod.

FIG. 4 shows a longitudinal section through the throttle arrangement 1 according to the invention from FIG. 1*a*, whereby in this representation only one half of the throttle arrangement 1 and one half of a piston rod 21 are visible. The individual sealing discs 2*a-e*, the first cylindrical first leg 4 and the body to be sealed, i.e. in this embodiment the piston rod 21, are aligned coaxially with one another in the depiction shown, so that between the boundary surface 8 and the outer circumferential surfaces 10*a-e* of the sealing discs 2*a-e* a first annular gap RS1*a-e* is formed in each case, which is fluidically connected to the high-pressure side 1*a* through gas passage openings (not shown). In addition, a second annular gap RS2*a-e* is formed between the sliding surface 9 of the piston rod 21 and the inner circumferential surfaces 11*a-e* of the sealing discs 2*a-e* in each case, the radial width of which in the embodiment example shown is 0.1 mm, approximately one fifth of the radial width of the first annular gap. In the new state, i.e. before the sealing discs 2*a-e* are retracted for a certain period of time, the sealing discs 2*a-e* are designed in such a way that their inner circumferential surfaces 11*a-e* project in the radial direction beyond the inner circumferential surface 14 of the central through-opening of the second leg 5, as shown in FIG. 4. In the embodiment shown in FIG. 4, the inner diameter of the sealing discs is only a few hundredths of a millimeter or a few tenths of a millimeter larger than the diameter of the piston rod 21. Contact between the sealing discs 2*a-e* and the moving piston rod 21 during operation results in the inner circumferential surfaces 11*a-e* abutting against the sliding surface 9 during a running-in phase, and material is thereby removed from the respective inner circumferential surfaces 11*a-e* of the abutting sealing discs 2*a-e*. The inner diameter of the sealing discs 2*a-e* and thus also the second annular gap RS2 thus grows successively to a diameter which essentially corresponds to the first annular gap RS1 before further wear of the sealing discs 2*a-e* is prevented by the limitation of the radial clearance by the boundary surface 8. Thus, in the use of the throttle arrangement 1 according to the invention, a small amount of wear is first allowed on the inner circumferential surfaces 11*a-e* of the sealing discs 2*a-e* before the sealing discs 2*a-e* are prevented from further wear by the first annular gap RS1*a-e*.

Figure 5:
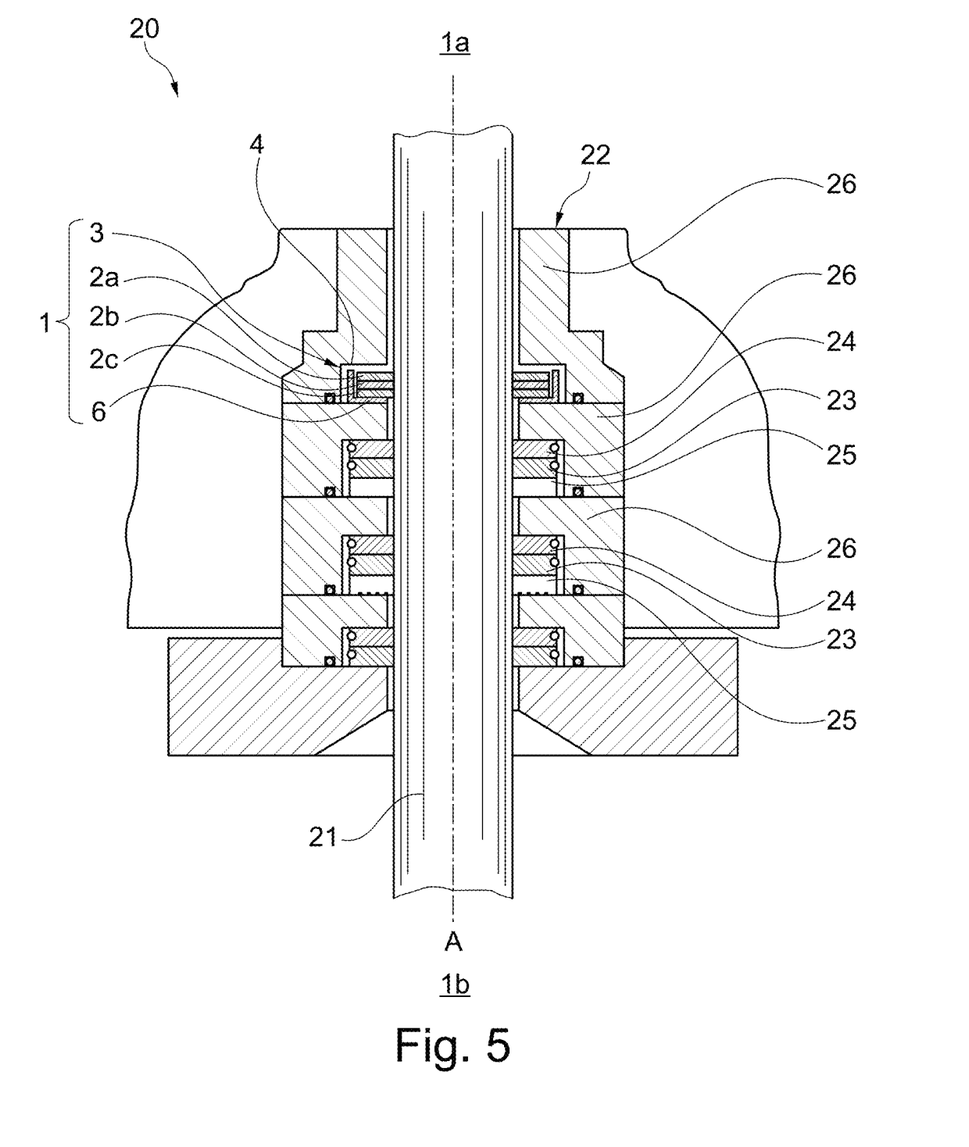
FIG. 5 a longitudinal section through a piston rod packing of a piston compressor comprising a throttle arrangement according to the invention.

FIG. 5 shows a longitudinal section through a piston rod packing 22 of a dry-running piston compressor 20 with a throttle arrangement 1 according to the invention. The piston compressor has a piston rod 21 which is mounted so as to be longitudinally movable in the axial direction A, the cylinder being located on the high-pressure side 1*a* and the piston rod drive being located on the low-pressure side 1*b* when the throttle arrangement 1 is installed or in use. The piston rod packing 22 comprises a plurality of chamber rings 26 arranged one behind the other with sealing rings 23 arranged therein. In the embodiment shown in FIG. 5, the sealing rings 23 are each arranged between a cover ring 24 and a support ring 25. Between two adjacent chamber rings 26 there is thus in each case a so-called sandwich ring comprising, in the direction of the piston rod 21, a cover ring 24, a sealing ring 23 and a support ring 25. However, the presence of support rings and cover rings is not absolutely necessary, as shown with the sealing element arranged at the bottom of the piston rod packing 22. The throttle arrangement 1 is arranged at the high-pressure-side inlet of the piston rod packing 22 and, in the illustrated embodiment example, comprises three sealing discs 2a-c, which are arranged stacked on top of one another in the axial direction A in the sealing disc holder 3. The axial height of the throttle arrangement 1 is thereby somewhat smaller than the width of the groove formed by the two adjacent chamber rings 26 accommodating the throttle arrangement 1. The throttle arrangement 1 is thus inserted with axial play between these chamber rings 26. Due to the fact that the first leg 4 of the sealing disc holder extends slightly above the sealing disc 2a arranged uppermost in the sealing disc holder, the sealing discs 2a-c are not clamped between the bearing surface 6 and the chamber ring 26 adjacent to the throttle arrangement on the high pressure side. Therefore, the sealing discs 2a-c have axial clearance in use, allowing radial movement of the sealing discs 2a-c in use.

Figure 6A:
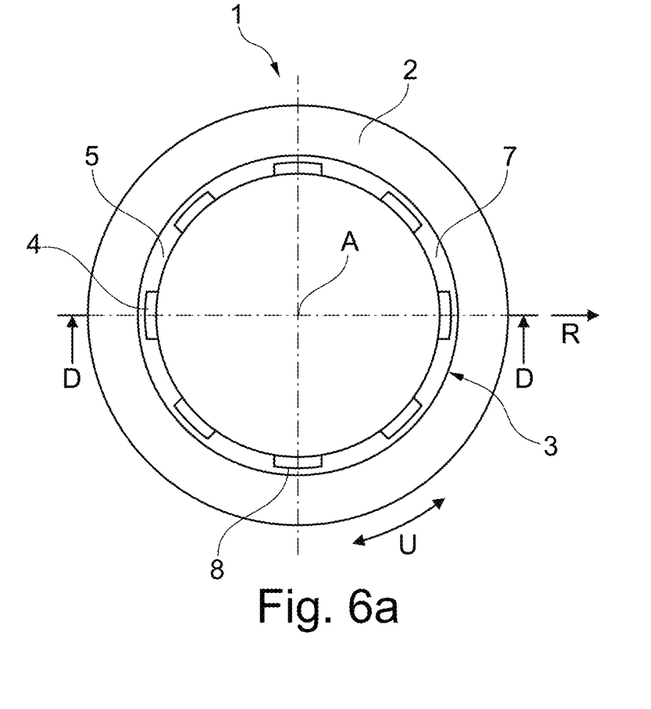
FIG. 6a a top view of a second embodiment of a throttle arrangement according to the invention.

FIG. 6a shows a top view of a second embodiment of a throttle arrangement 1 according to the invention, comprising a sealing disc holder 3 and a plurality of sealing discs 2, whereby, in accordance with the top view shown, only the sealing disc 2 arranged uppermost in the axial direction A is visible in this representation. The sealing disc holder 3 has an L-shaped radial section in the radial direction R, as can be seen below in FIG. 6b, with a first leg 4 running in the axial direction A and a second leg 5 running transversely to the axial direction A. The second leg 5 is of annular design and has a bearing surface 6 on which the sealing discs 2 are arranged stacked on top of one another in the axial direction A. The first leg 4 is cylindrical in shape and the second leg 5 is circular in shape. The first leg 4 is cylindrical in shape and extends in the circumferential direction U along the inner circumference of the second leg 5 from the bearing surface 6 in the direction of the sealing discs 2. On its side facing the sealing discs 2, the first leg 4 also has a boundary surface 8 in the form of a cylinder jacket in the circumferential direction U, which is interrupted in the circumferential direction U by eight uniformly distributed gas passage openings 7.

Figure 6B:
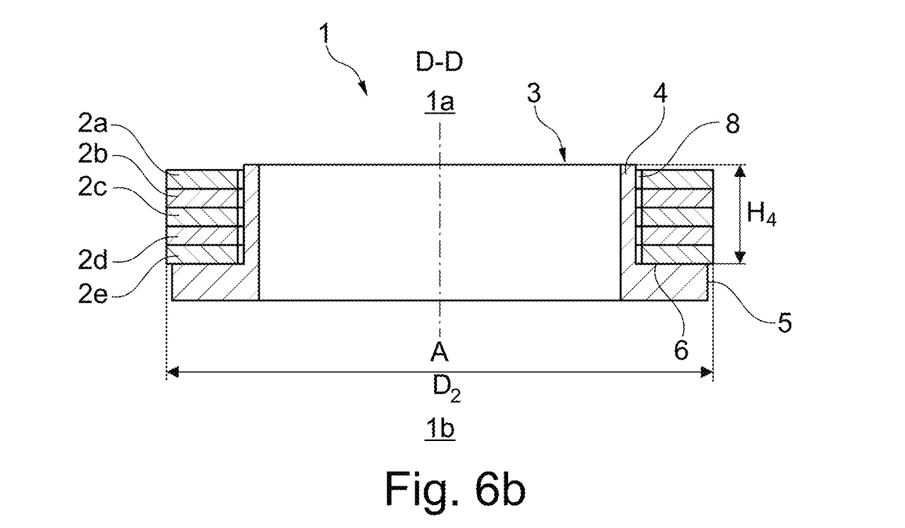

FIG. 6b shows a longitudinal section through the throttle arrangement 1 shown in FIG. 6a along the line of intersection D-D in FIG. 6a. A total of five sealing discs 2a-e can be seen, which are stacked on top of each other in axial direction A. The sealing discs 2 can be inserted into the sealing disc holder 3 from the high-pressure side 1a, whereby the sealing disc 2e arranged at the bottom of the sealing disc holder 3 rests with its flank pointing in the direction of the low-pressure side 1b on the bearing surface 6 of the second leg 5. In the embodiment shown, the second leg 5 points radially outward with respect to the first leg 4. Consequently, the cylindrical first leg 4 extends along the inner circumference of the second leg 5, namely from the bearing surface 6 over slightly more than the entire axial height of the stacked sealing discs 2a-e in the direction of the high-pressure side 1a. The first leg 4 has an axial height $H_4$ of 13 mm, with the axial height of the sealing discs 2 being 2.5 mm each (not shown). The difference between the axial height of the first leg $H_4$ and the sum of the axial heights of the stacked sealing discs 2a-e results in an axial clearance of the sealing discs 2 in the sealing disc holder 3 of 0.5 mm in the embodiment shown, which ensures that the sealing discs 2 can be moved in the radial direction in use.

Figure 7:
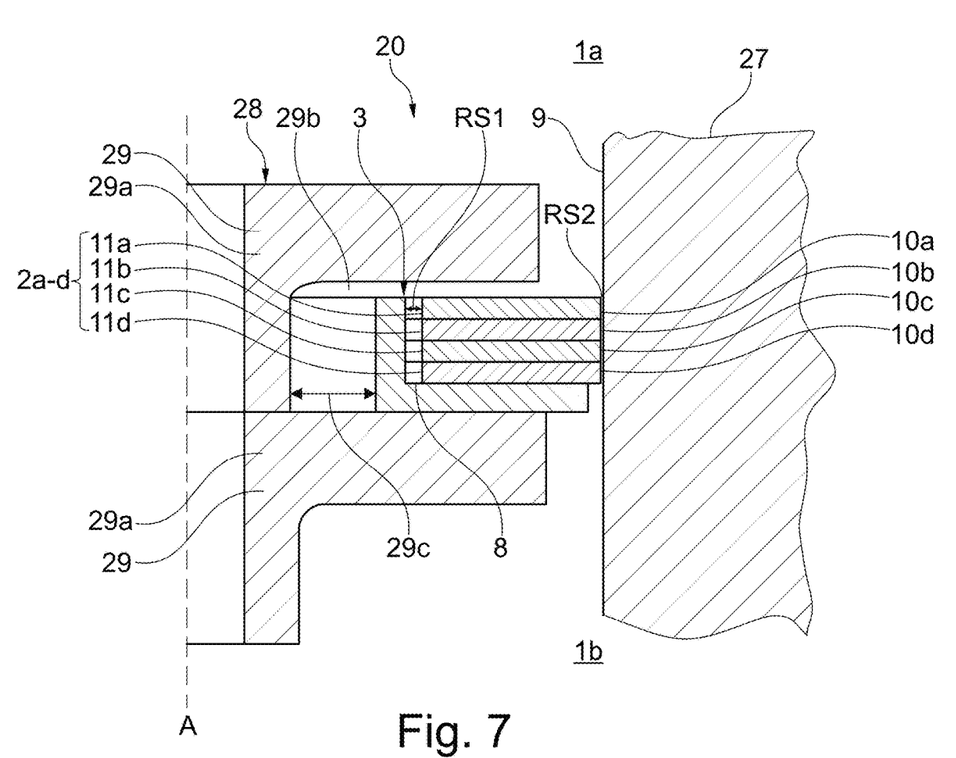
FIG. 7 a longitudinal section through a piston compressor showing one half of the throttle arrangement according to the invention of FIG. 6a with a cylinder tread.

FIG. 7 shows a longitudinal section through a piston compressor comprising a cylinder 27, a piston 28 and at least one throttle arrangement 1 arranged in the piston 28 as described above in FIGS. 6a and 6b. The piston 28 is configured as a built piston, and comprises a plurality of piston bodies 29 arranged in succession in the axial direction A, each piston body 29 having a chamber disc 29a which forms an interior space 29b. A throttle arrangement 1 is arranged in the interior space 29b. In FIG. 7, the compression chamber 1a of the piston compressor 20 is arranged at the top, and the crankcase, or low-pressure part 1b, is arranged at the bottom. The throttle arrangement 1 comprises a sealing disc holder 3 and four annular sealing discs 2a-d, which each form a first annular gap RS1 with their radially inwardly facing circumferential surfaces 11a-d and the boundary surface 8 of the sealing disc holder 3. The sealing disc holder 3 is spaced transversely to the axial direction A with respect to the chamber disc 29a, forming an inner gap 29c. In the shown embodiment example, the axial height of the first leg $H_4$ is slightly less than the axial height of the inner space 29b, whereby the inner gap 29c is fluid-conductively connected to a high-pressure side space 1a which is further up and not visible in the shown view. Consequently, the first annular gap RS1 is also fluidically connected to the high pressure side 1a through the gas passage openings 7 in the first leg 4 (not visible in the view shown). As a result of contact between the sealing discs 2a-d and the cylinder sliding surface 9 of the cylinder 27 during operation of the piston compressor 20, material is removed from the outer circumferential surfaces 10a-d of the sealing discs 2a-d, causing the outer diameter of the sealing discs 2a-d and thus also the second annular gap RS2 existing between the outer circumferential surfaces 10a-d and the sliding surface 9 to successively increase. As soon as the second annular gap RS2 has grown to a diameter which essentially corresponds to the first annular gap RS1, further wear of the sealing discs 2a-d is prevented due to the limitation of their radial clearance by the boundary surface 8. In the embodiment of the throttle arrangement 1 according to the invention shown in FIG. 7, therefore, a small amount of wear is first permitted on the outer circumferential surfaces 10a-d of the sealing discs 2a-d before the sealing discs 2a-d are prevented from further wear by the first annular gap RS1a-d.

Figure 8:
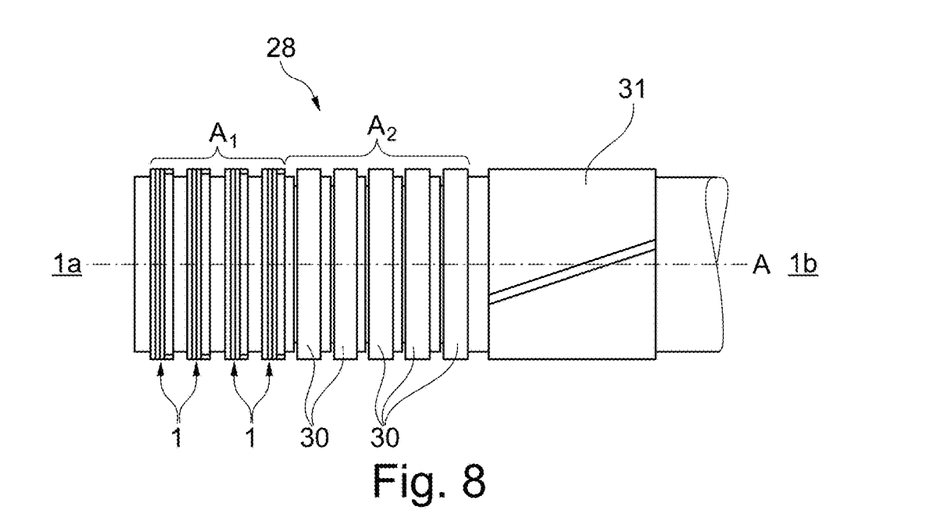
FIG. 8 a side view of a piston with a plurality of throttle arrangements according to the invention.

FIG. 8 shows a side view of an example of a piston 28 which, starting from the high-pressure side 1a, has four throttle arrangements 1 according to the invention, which are arranged spaced apart from one another in the axial direction A in the region A1 of the piston 28. In the axial direction A, the piston 28 subsequently comprises five further sealing elements 30 in the region A2. In addition, a guide ring 31 is arranged on the low-pressure side 1b.

List of Reference Signs

1 Throttle arrangement
1a High pressure side
1b Low pressure side
2 Sealing disc
3 Sealing disc holder
4 First leg
5 Second leg
6 Bearing surface
7 Gas passage opening
8 Boundary surface 9 Sliding surface of the body to be sealed
10 Outer circumferential surface of the sealing disc
11 Inner circumferential surface of the sealing disc
12 Central through hole of the sealing disc
13 Central through hole of the bearing surface 6
14 Inner circumferential surface of the central through hole 13
20 Piston compressor
21 Piston rod
22 Piston rod packing
23 Sealing ring
24 Cover ring
25 Support ring
26 Chamber ring
27 Cylinder
28 Piston
29 Piston body
29a Chamber disc
29b Interior
29c Inner gap
30 Sealing element
31 Guide ring
A Axial direction
$B_7$ Circular arc length of a gas passage opening
$B_8$ Circular arc length of a boundary surface segment
$D_2$ Outside diameter of a sealing disc
$D_{12}$ Inner diameter of a sealing disc
$D_8$ Inner diameter of the receiving chamber
$D_{13}$ Inner diameter of the central through hole 13
$H_2$ Axial height of a sealing disc
$H_4$ Axial height of the first leg
R Radial direction
RS1 First annular gap
RS2 Second annular gap
U Umfangsrichtung

The invention claimed is:

1. A throttle arrangement for sealing a sliding surface of a piston rod or a piston of a piston compressor movable in an axial direction A, the throttle arrangement having in use a high-pressure side on the compression chamber side and a low-pressure side on the crank drive side, the throttle arrangement comprising a plurality of annular sealing discs and a sealing disc holder, wherein the sealing disc holder has an L-shaped radial section, with a first leg extending in the axial direction A and a second leg extending transversely to the axial direction A, which legs together form the L-shaped radial section, the second leg being of annular design and having a bearing surface pointing in the direction of the high-pressure side, on which bearing surface the sealing discs are arranged stacked one on top of the other in the axial direction A, the first leg being cylindrical and extending along the outer or inner circumference of the second leg from the bearing surface in the direction of the high-pressure side, an axial height of the first leg $H_4$ being selected in such a manner that the sealing discs stacked on the bearing surface have axial play in use, the first leg having a plurality of gas passage openings, the first leg having a boundary surface pointing in the direction of the sealing discs, wherein, when the sealing discs are aligned coaxially with the first leg and the body to be sealed, a first annular gap RS1 is formed in each case between the boundary surface and the sealing discs, which annular gap is fluidically connected to the high-pressure side by the gas passage openings, and wherein a second annular gap RS2 is formed between the sliding surface of the body to be sealed and the sealing discs in each case, the wear-related enlargement of which is essentially limited by a radial width of the first annular gap RS1.

2. The throttle arrangement according to claim 1, wherein the radial width of the first annular gap RS1 does not exceed 1 mm in each case.

3. The throttle arrangement according to claim 1, wherein the gas passage openings extend over the entire axial height $H_4$ of the first leg.

4. The throttle arrangement according to claim 1, wherein the gas passage openings are arranged uniformly distributed in the circumferential direction U of the first leg.

5. The throttle arrangement according to claim 1, wherein a ratio between the sum of the areas of the gas passage openings and a boundary area including the areas of the gas passage openings is between 1:2 and 1:4.

6. The throttle arrangement according to claim 1, wherein the first leg comprises eight gas passage openings.

7. The throttle arrangement according to claim 1, wherein the sealing disc holder is formed in one piece.

8. The throttle arrangement according to claim 1, wherein the number of sealing discs is at least three.

9. The throttle arrangement according to claim 1, wherein the sealing discs are formed integrally and endlessly.

10. The throttle arrangement according to claim 1, wherein an axial height $H_2$ of the sealing discs is between 1 mm and 5 mm.

11. The throttle arrangement according to claim 1, wherein the sealing discs are made of different materials.

12. The throttle arrangement according to claim 1, wherein at least one of the sealing discs has an axial height $H_2$ different from the other sealing discs.

13. The throttle arrangement according to claim 12, wherein the axial height $H_2$ of the sealing discs increases in the direction of the low-pressure side.

14. A piston compressor having at least one throttle arrangement according to claim 1.

15. The throttle arrangement according to claim 7, wherein the sealing disc holder is made of pure or filled high-temperature polymer, pure or filled fiber composite material or of metal.

16. The throttle arrangement according to claim 8, wherein the number of sealing discs is exactly five.

17. The throttle arrangement according to claim 10, wherein the axial height $H_2$ of the sealing discs is between 2.4 mm and 2.6 mm.

18. The throttle arrangement according to claim 11, wherein a modulus of elasticity of a material used for the sealing discs increases in the direction of the low-pressure side.

19. The throttle arrangement according to claim 12, wherein all sealing discs in the sealing disc holder have an axial height $H_2$ different from each other.

* * * * *